US009288458B1

(12) United States Patent (10) Patent No.: US 9,288,458 B1
Chen et al. (45) Date of Patent: Mar. 15, 2016

(54) FAST DIGITAL IMAGE DE-HAZING METHODS FOR REAL-TIME VIDEO PROCESSING

(71) Applicant: HRL Laboratories, LLC, Malibu, CA (US)

(72) Inventors: Zhichao Chen, Woodland Hills, CA (US); Yang Chen, Westlake Village, CA (US); Deepak Khosla, Camarillo, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/611,218

(22) Filed: Jan. 31, 2015

(51) Int. Cl.
*H04N 5/00* (2011.01)
*H04N 9/64* (2006.01)
*G06T 5/00* (2006.01)
*G06T 5/50* (2006.01)

(52) U.S. Cl.
CPC .............. *H04N 9/646* (2013.01); *G06T 5/009* (2013.01); *G06T 5/50* (2013.01); *G06T 2207/10016* (2013.01); *G06T 2207/10024* (2013.01); *G06T 2207/20208* (2013.01); *G06T 2207/30232* (2013.01)

(58) Field of Classification Search
CPC ............ H04N 5/21; H04N 5/213; G06T 5/40; G06K 6/40
USPC ......................................................... 348/615
See application file for complete search history.

(56) References Cited

U.S. PATENT DOCUMENTS

2010/0067823 A1* 3/2010 Kopf .................. G06K 9/00624
382/274
2010/0259651 A1* 10/2010 Fattal ...................... G06T 5/003
348/241
2011/0188775 A1* 8/2011 Sun .......................... G06K 9/40
382/274

OTHER PUBLICATIONS

J. Tarel et al, "Fast visibility restoration from a single color or gray level image," Computer Vision, IEEE 12th International Conference, pp. 2201-2208, 2009.
K. He, et al., "Single image haze removal using dark channel prior," IEEE Conference on Computer Vision and pattern Recognition, pp. 1956-1963, 2009.
R. Tan, "Visibility in bad weather from a single image," IEEE Conference on Computer Vision and Pattern Recognition, pp. 1-8, 2008.
R. Fattal, "Single image dehazing," SIGGRAPH, ACH Transations on Graphics, Article No. 72, 2008, pp. 72.1-72.9.
F. Cozman et al., "Depth from scattering," proceedings of the 1997 Conference on Computer Vision and pattern Recognition, vol. 31, pp. 801-806, 1997.

* cited by examiner

*Primary Examiner* — Michael Lee
(74) *Attorney, Agent, or Firm* — Tope-McKay & Associates (57) ABSTRACT

Described is system for image de-hazing for real-time video processing. A video comprising image frames is received as input. In determining an atmospheric veil value to use, the system leverages temporal correlations or specific scene constraints to determine whether to use a new atmospheric veil value or a previously determined atmospheric veil value. A global atmospheric light value is estimated as an average of a set of the brightest pixels in an upper region of an image frame. A de-hazed image is generated from the current image frame using either the previously determined atmospheric veil value or the new atmospheric veil value and the global atmospheric light value.

18 Claims, 11 Drawing Sheets

FAST DIGITAL IMAGE DE-HAZING METHODS FOR REAL-TIME VIDEO PROCESSING

FIELD OF INVENTION

The present invention relates to a system for image de-hazing and, more particularly, to a system for image de-hazing for real-time video processing.

BACKGROUND OF THE INVENTION

Images of outdoor scenes are usually degraded by atmospheric particles, such as haze, fog and smoke, which fade the color and reduce the contrast of objects in the scene. Poor visibility becomes a major problem for outdoor video surveillance applications. Haze removal is difficult because the amount of visible haze is dependent on depth information. The depth information is unknown given only a single image, making the de-haze problem ill-posed. Even when the depth information can be estimated, noise can be a major problem when restoring hazy images. Standard image enhancement algorithms, such as histogram equalization, linear mapping, and gamma correction, introduce halo artifacts and color distortion. Existing de-hazing approaches rely on sophisticated numerical optimization algorithms, which result in high computational costs and cannot satisfy real-time application requirements, especially for a high resolution video surveillance system.

Existing de-hazing processes for single images follow the same steps: estimate the veil (due to haze) in the image at each pixel location, and then apply a restoration algorithm to the pixel value. Most of these processes use a sophisticated model to estimate the veil, which results in high computation costs. Recent work on single image de-hazing has made significant progress. He et al. (see the List of Incorporated Cited Literature References, Literature Reference No. 2) proposed a method based on a so-called dark channel prior for single image haze removal. Using this method, a coarse estimation of the transmission map is obtained by dark pixels in local windows and then refined by an image soft-matting technique. Furthermore, Fattal (see Literature Reference No. 4) obtained the transmission map through independent component analysis by assuming that transmission and surface shading are locally uncorrelated. In addition, Tan (see Literature Reference No. 3) aimed to maximize the local contrast by developing a cost function in the framework of Markov random fields (MRFs).

A common problem of the above methods is that they are too slow for real-time applications. For example, the method of He et al. (see Literature Reference No. 2) takes approximately 250 seconds for a 3000 by 400 pixels image on a modern computer. Moreover, the method of Fattal (see Literature Reference No. 4) is reported to have bad performance for heavy haze images, and the method of Tan (see Literature Reference No. 3) suffers from a very saturated scene.

Tarel et al. (see Literature Reference No. 1) proposed a median filter-based process to solve the single image de-hazing problem. It is faster than the processes described in Literature Reference Nos. 2, 3, and 4, since its complexity is only a linear function of the number of input image pixels. However, it still takes 0.6 seconds on the same computer processing unit (CPU) for an image of 3000 by 400 pixels, which is still too slow for real-time video surveillance applications. In addition, Tarel's method estimates the global atmospheric light from the pixels with high intensity, which may lead to incorrect global atmospheric light estimation due to white objects in the scene.

Thus, a continuing need exists for a robust and fast image de-hazing process for real-time video processing.

SUMMARY OF THE INVENTION

The present invention relates to a system for image de-hazing and, more particularly, to a system for image de-hazing for real-time video processing. The system comprises one or more processors and a memory having instructions such that when the instructions are executed, the one or more processors perform multiple operations. The system receives a video comprising a series of image frames as input. Each image frame comprises a plurality of regions comprising a plurality of pixels. For each image frame in the series of image frames, the system determines if a predetermined image frame number threshold has been reached. If the predetermined image frame number has not been reached, then a previously determined atmospheric veil value is used, and wherein if the predetermined image frame number has been reached, a new atmospheric veil value is determined. A global atmospheric light value is estimated, and a de-hazed image is generated from the current image frame using either the previously determined atmospheric veil value or the new atmospheric veil value and the global atmospheric light value.

In another aspect, for each image frame in the series of image frames, the system determines if pixels in a current image frame are similar to corresponding pixels in a previous image frame. If pixels in the current image frame are similar to the corresponding pixels in the previous image, then the system uses a previously determined atmospheric veil value. If the pixels in the current image frame are not similar to the corresponding pixels in the previous image frame, then a new atmospheric veil value is determined.

In another aspect, the system determines a sum of absolute differences (SAD) between each pixel in the previous image frame and a corresponding pixel in the current image frame.

In another aspect, the system estimates the global atmospheric light value as an average of a set of the brightest pixels in an upper region of the image frame.

In another aspect, the system determines the atmospheric veil value for an image frame, having a plurality of image rows, according to the following. The system determines a minimal color value of each image row in the plurality of image rows, forming a vector w indexed by the plurality of image rows. The system then determines a non-increasing function of the plurality of image rows z of the vector w, and the vector w is replicated horizontally to form an image having the same size as the current image frame.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The file of this patent or patent application publication contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where.

DETAILED DESCRIPTION

The present invention relates to a system for image de-hazing and, more particularly, to a system for image de-hazing for real-time video processing. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Finally, specific details of the present invention are provided to give an understanding of the specific aspects.

(1) List of Incorporated Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. J. Tarel and N. Hautiere. Fast visibility restoration from a single color or gray level image, Computer Vision, IEEE 12th International Conference, 2009.
2. K. He, J. Sun and X. Tang. Single image haze removal using dark channel prior. IEEE Conference on Computer Vision and Pattern Recognition, 2009.
3. R. Tan. Visibility in bad weather from a single image. IEEE Conference on Computer Vision and Pattern Recognition, 2008.
4. R. Fattal. Single image dehazing. SIGGRAPH, ACM Transactions on Graphics, 2008.
5. F. Cozman and E. Krotkov. Depth from scattering. Proceedings of the 1997 Conference on Computer Vision and Pattern Recognition, vol. 31, pp. 801-806, 1997.

(2) Principal Aspects

The present invention has three "principal" aspects. The first is a system for image de-hazing for real-time video processing. The system is typically in the form of a computer system operating software or in the form of a "hard-coded" instruction set and may include one or more sensors that capture the images for processing. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
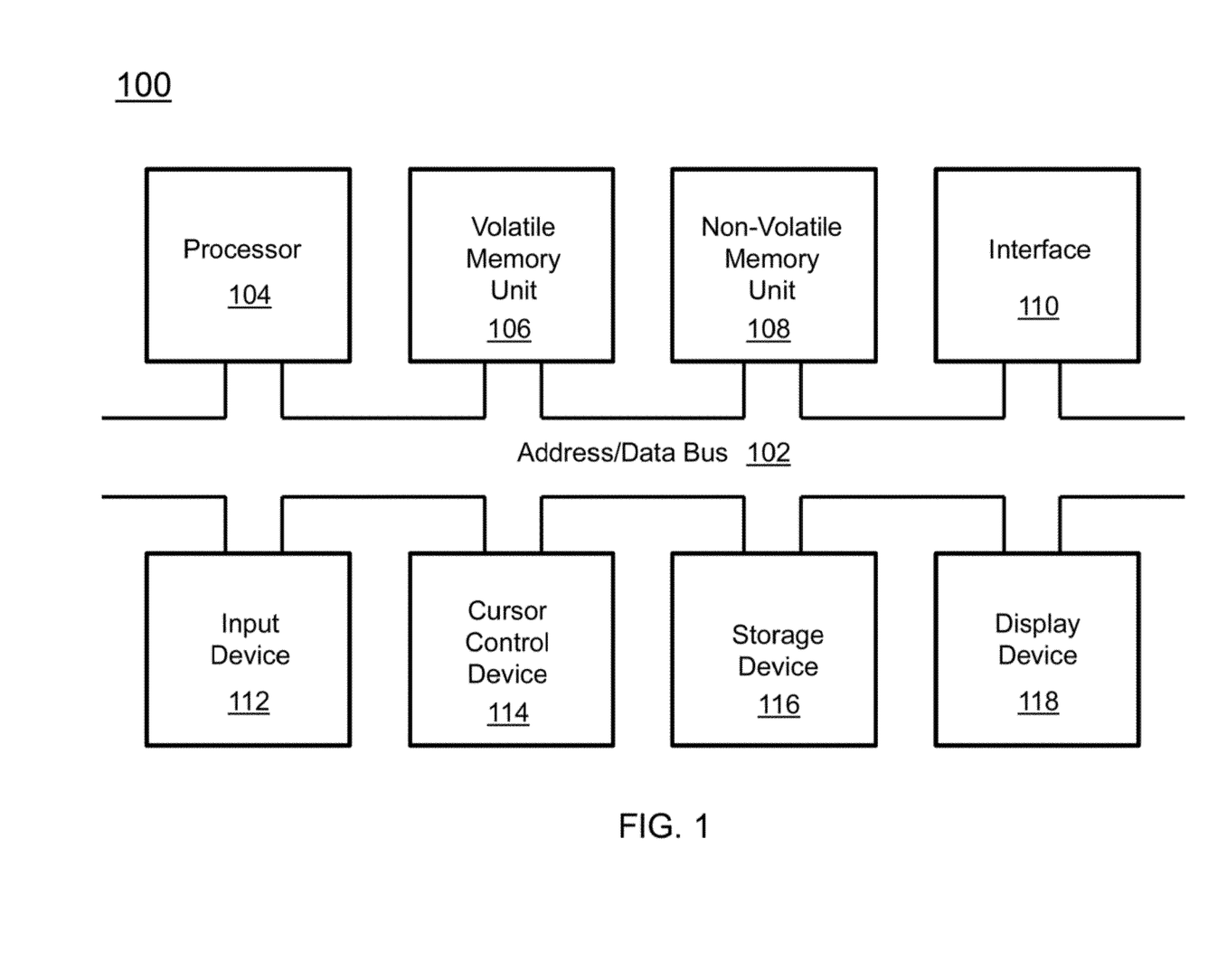
FIG. 1 is a block diagram depicting the components of a system for image de-hazing according to the principles of the present invention.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
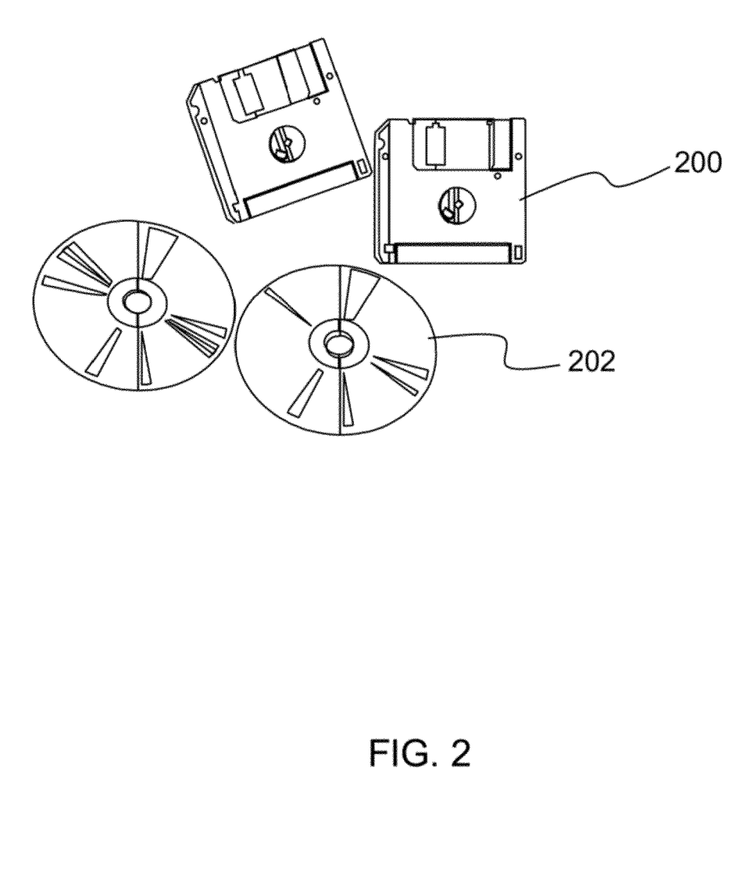
FIG. 2 is an illustration of a computer program product according to the principles of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of the Invention

Images of outdoor scenes are usually degraded by atmospheric particles, such as haze, fog and smoke, which fade the color and reduce the contrast of the objects, depending on the distances of the scene points from the camera. Poor visibility becomes a major problem for outdoor video surveillance applications.

Existing de-hazing processes for single images follow the same steps: estimate the veil (due to haze) in the image at each pixel location, and then apply a restoration algorithm to the pixel value. Most of these processes use a sophisticated model to estimate the veil, which results in high computation costs. Tarel et al. (Literature Reference No. 1) proposed a median filter based approach that is the fastest among competing algorithms as well as one of the best performing on single images. However, this method is still too slow for real-time video surveillance applications.

Unlike still images, a video sequence provides more information about the scene than a single image can, but much of this is redundant. For example, consecutive image frames are highly correlated. The de-hazing process can be significantly accelerated by reusing pre-computed results from previous frames with the state-of-the art algorithms developed for single image applications in order to achieve real-time de-hazing for high resolution video sequences.

Figure 3:
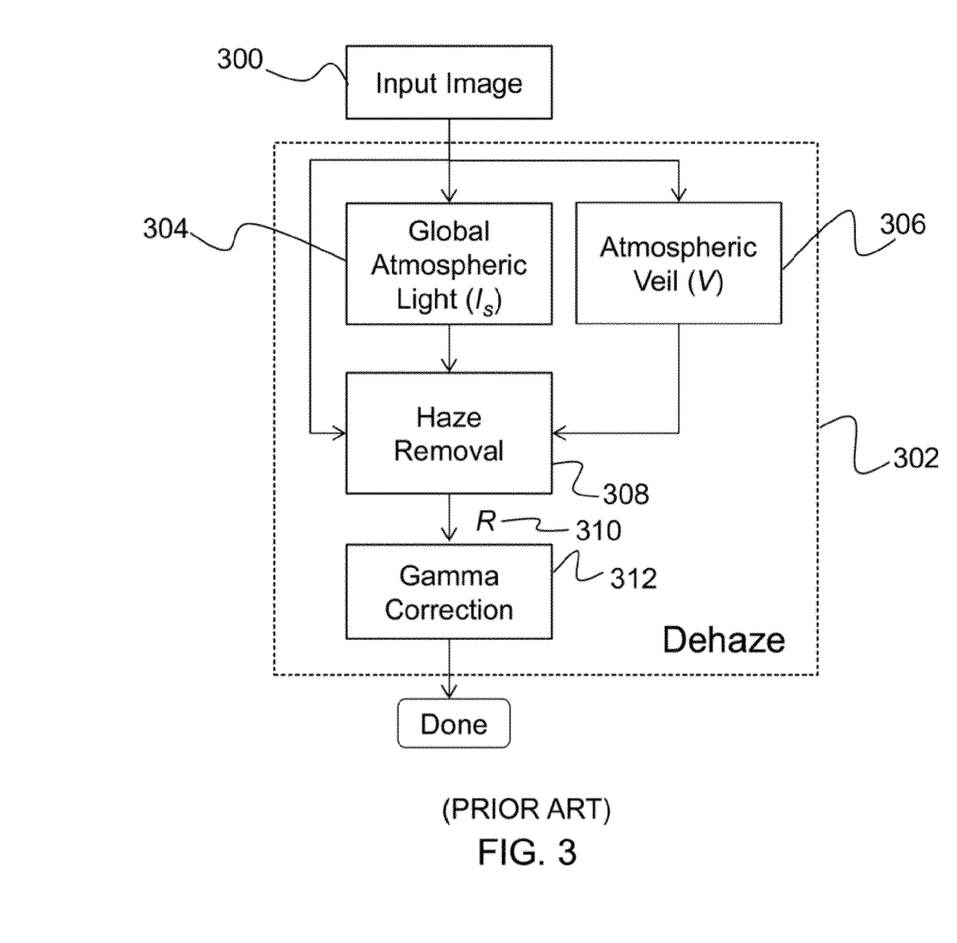
FIG. 3 illustrates the baseline de-hazing process according to prior art.

The present invention estimates an atmospheric model and provides a fast de-hazing approach for video sequences suitable for real-time applications with high resolution videos. The atmospheric veil 306 is roughly estimated by the minimal component of color channels and then refined by a median filter to smooth and preserve sharp edge discontinuities. The median filter is a non-linear digital filtering technique, typically used to remove noise. In addition, simple and effective sky segmentation is performed to improve the global atmospheric light 304 estimation and prevent color distortion. In a first aspect, to reduce computation for real-time applications, temporal correlations between successive image frames in video sequences are exploited to reduce redundant calculations in order to drastically accelerate the processing speed. In a second aspect, the special imaging condition of a landscape scene is exploited to simplify the estimation of the atmospheric model, therefore, achieving accelerated processing speed.

An advantage of the method described herein is its speed. The single-image based de-haze process, described in Literature Reference No. 1, is applied periodically to estimate the key parameters, which will be re-used for subsequent frames, thereby reducing recalculation. Additionally, temporal correlation is applied to determine the differences of pixels in sub-sequences. If the region in the current frame is similar to the co-located region in the previous frame, the stored corresponding result can be re-used. By applying a rough sky segmentation step to estimate the global atmospheric lighting 304, the system according to the principles of the present invention can achieve similar or better quality results compared with the single-image based de-haze process according to the prior art with 4× speed-ups, making it suitable for real-time applications. Moreover, the approach described herein works on a per pixel basis. This allows the system to retain sharp detail near object boundaries.

There have been several attempts to remove haze and enhance the visibility of images. Some researchers rely on additional information, including multiple images of the same scene taken under various atmospheric conditions or under different polarization angles, depth-maps, or a three-dimensional (3D) model obtained by user assistance. These methods are very constraining for data acquisition and are unable to deal with dynamic scenes, thus being impractical for videos. The system described herein improves upon the prior art by providing a fast de-hazing method for video sequences, expanding on atmospheric model based state-of-the-art de-hazing techniques, as will be described in detail below.

(3.1) Atmospheric Scattering Model

The atmospheric scattering model described in Literature Reference No. 5 is used to describe a hazy image, as shown in the following:

$$I(x, y) = R(x, y)\left(1 - \frac{V(x, y)}{I_S}\right) + V(x, y). \tag{1}$$

where, $I(x, y)$ is the input hazy image at $(x, y)$; $R(x, y)$ is the de-hazed (or restored) image; $I_s$ the global atmospheric light 304; and $V(x, y)$ is the atmospheric veil 306, also called the transmission map. $I_s$ usually set to $(1, 1, 1)$ assuming that the input image $I(x, y)$ is normalized between 0 and 1. Since the accuracy of the global atmospheric light 304, $I_s$, plays an important role in the restoration process, the system according to the principles of the present invention provides a simple and more robust method for its estimation, which will be described in further detail below.

(3.2) Atmospheric Veil 306

In the present invention, the median filter based approach of Tarel et al. (see Literature Reference No. 1 for a description of the median filter based approach) was adopted by maximizing the contrast to infer an atmospheric veil 306 from the input image 300. For each pixel, the atmospheric veil 306 cannot be higher than the minimum of the components of $I(x, y)$. $W(x, y)$ is computed as the image of the minimal component of $I(x, y)$ over RGB (red, green, blue) channels. The de-hazed image is assumed to be smooth in most regions except along edges with large depth discontinuity. Therefore, the median filter is used on $W(x,y)$ to perform an edge preserving smoothing. The atmospheric veil 306 $V(x, y)$ is computed as the difference, $B(x, y)$, between the local average of $W(x, y)$ and the local standard deviation of $W(x, y)$. The local average of $W(x,y)$ is, thus, computed as $A(x, y) = \text{median}_s(W(x, y))$, where s is the size of the window used in the median filter. In practice, s value depends on the maximum size of assumed white objects in the scene. Standard deviation $|W(x, y) - A(x, y)|$ must be robustly estimated by using the median filter again. The last step consists of multiplying $B(x, y) = A - \text{median}_s(|W - A|)$ by factor p in $[0, 1]$ to control the strength of the visibility restoration, where p is a user selectable parameter. For experimental studies using the present invention, p was set to 0.7.

The atmospheric veil estimation described in Literature Reference No. 1 is summarized below.

1. Calculate minimum component, $W(x,y) = \min(I(x,y))$.
2. Calculate local average of $W(x,y)$, $A(x,y) = \text{median}_s(W(x,y))$.
3. Calculate local standard deviation of $W(x,y)$, $S(x,y) = \text{median}_s(|W(x,y) - A(x,y)|)$.
4. Calculate difference, $B(x,y) = A(x,y) - S(x,y)$
5. Calculate atmospheric veil, $V(x,y) = \max(\min(pB(x,y), W(x,y)), 0)$.

(3.3) Global Atmospheric Light 304

In Literature Reference No. 1, the global atmospheric light 304 is estimated by white regions, which is usually in the sky.

To avoid disturbing white objects in the scene, the authors depend on the window size of the median filter to filter white objects. However, wrong estimation of global atmospheric light 304 could distort colors of de-hazed images.

The system according to the principles of the present invention roughly estimates the sky region. The purpose of rough sky segmentation is to estimate the global atmospheric light. It is assumed that the sky is free of larger gradients and located at the top of the image. Regions with small gradients that border the upper edge of the image are searched. The global atmospheric light 304 is estimated to be the average of the 5% brightest pixels in those regions.

(3.4) Recovery of Hazy Image

Since the global atmospheric light 304 $I_s$ and the atmospheric veil 306 V(x,y) are inferred, according to equation (1), the hazy image is recovered by:

$$R(x, y) = \frac{I(x, y) - V(x, y)}{1 - \frac{V(x, y)}{I_S}}. \quad (2)$$

The image after haze removal 308 looks dim and, therefore, gamma correction 312 can be applied for contrast enhancement. Gamma correction 312 is a nonlinear operation used to code and decode luminance or tristimulus values in image systems.

Gamma correction 312 is used to enhance the visibility of the image so that the final output image has a similar look to the original. An exponent function is applied to the de-hazed image pixel values so that the standard deviation of the output image matches that of the original image according to the following:

$$V_{out} = pV_r^\gamma,$$

where $V_{out}$ is the output of gamma-corrected image pixel values, $V_r$ is the de-hazed image (as input to gamma correction process), and $\gamma$ and p are the parameters for gamma correction to be determined as shown below:

$$\gamma = (\sigma_o/\sigma_r)g$$

$$p = \exp(m_o - m_r \gamma \gamma),$$

where $\sigma_o$ and $\sigma_r$ are standard deviations of log (natural logarithmic function) of the luminance values of the original image and the de-hazed image, respectively, and $m_o$ and $m_r$ are mean values of log( ) (i.e., natural log function) of the luminance values of the original image and the de-hazed image, respectively; g is a constant factor to control the amount of gamma correction to apply, with a typical value of 1.3; exp(x) is the exponent function of x, $e^x$. The means and standard deviations mentioned above are estimated from the bottom ⅔ of the images to exclude the sky portion of the images which can skew the results.

FIG. 3 illustrates a baseline de-hazing process according to prior art (see, for example, Literature Reference No. 1), aspects of which are described in detail above. An input image 300 is received, and the baseline de-hazing process 302 is applied to the input image 300. During the baseline de-hazing process 302, the global atmospheric light ($I_s$) 304 and the atmospheric veil (V) 306 are estimated and used for haze removal 308 to obtain a restored (or de-hazed) image R 310. Gamma correction 312 is applied to make the restored image R 310 more visually appealing. The system described herein improves upon the prior art by providing a fast de-hazing method for video sequences, expanding on atmospheric model based state-of-the-art de-hazing techniques. The system according to the principles of the present invention can achieve similar or better quality results with 4× speed-ups over the baseline de-hazing process depicted in FIG. 3 by leveraging temporal correlations and exploiting special haze model in landscape scene. This makes it more suitable for real-time surveillance applications than the direct application of the original algorithm in a frame-by-frame approach. Moreover, as will be described in further detail below, the system according to the principles of the present invention works on a pixel-by-pixel basis.

Figure 4:
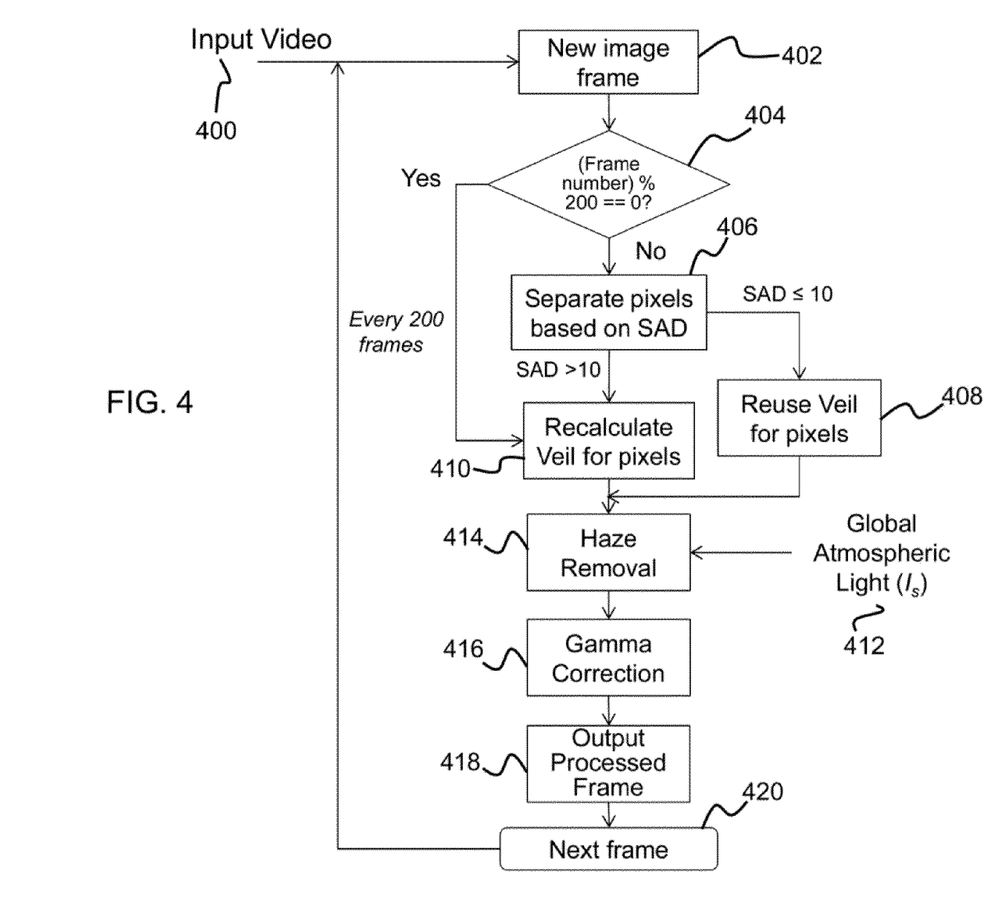
FIG. 4 illustrates the de-hazing process optimized with acceleration according to the principles of the present invention.

(3.5) Application to Video Object Detection (3.5.1) Optimized De-Hazing with Acceleration In surveillance applications with a fixed video camera, background is almost unchanged between temporally successive frames. This makes it possible to accelerate the de-hazing process by re-using computed results between neighboring frames. FIG. 4 illustrates the de-hazing process optimized with acceleration according to the principles of the present invention. An input video 400 comprising a plurality of image frames is received. For each new image frame 402, the system determines the remainder of the image frame numbers with respect to 200, so that a test of (frame#) % 200==0? 404 will be true every 200 frames. The threshold of 200 frames is provided as a non-limiting example, but is not limited thereto. "frame#" is an image frame number, which is a sequential number assigned to each input image frame. If there are no remaining image frame numbers, the pixels are separated based on the sum of absolute differences (SAD). The SAD is determined for each pixel by taking the absolute difference between each pixel in the first image frame and the corresponding pixel in the new image frame 402 being used for comparison. As a non-limiting example, the SAD with a 5 by 5 pixels window size is used to determine if a pixel is similar to its co-located corresponding pixel in the previous image frame. The luminance value is used to calculate the SAD. The luminance of RGB image can be computed as a weighted sum of RGB channel values, and in its simplest form the weights are the same: Y=(R+G+B)/3, which is what was used in experimental studies of the present invention.

If the SAD is less than or equal to a pre-defined threshold (e.g., 10 in all examples described below for images in RGB format with 8 bits for each color channel having pixel values ranging 0 to 255), the entire 5 by 5 pixels window is considered "similar". The calculation for this block is then skipped, and the system reuses the previously calculated atmospheric veil for pixels 408. If the SAD is greater than the pre-defined threshold, then the system recalculates the atmospheric veil for the pixels 410. In other words, if the pixels in the current image frame (i.e., new image frame 402) are similar to the co-located pixels in the previous image frame, the stored results computed from the previous image frame are re-used for the corresponding pixels in the current image frame, therefore, bypassing the calculation for the background region of the current image frame. The test results in "yes" for every pixel for the first image frame.

Additionally, if there are remaining image frame numbers with respect to 200, then the system recalculates the previously calculated atmospheric veil for the pixels 410. Then, the determined atmospheric veil (either previously calculated or re-used) along with the estimated global atmospheric light 412 are used for haze removal 414, followed by an optional gamma correction 416. After an image frame is processed, the processed (i.e., de-hazed) image is output 418, and the process proceeds to the next frame 420 in the input video 400.

If the illumination does not change between successive frames, the atmospheric veil map calculated from the first image frame and the parameters of gamma correction can also be re-used for all subsequent image frames. In practice, and in particular for long-term surveillance, in order to deal with illumination changes over time, the atmospheric veil map for all pixels and the parameters of gamma correction are updated every 200 frames. A normal frame rate of 30 frames per second was assumed. As described above, 200 frames was selected as a non-limiting example for the frame number.

Figure 5A:
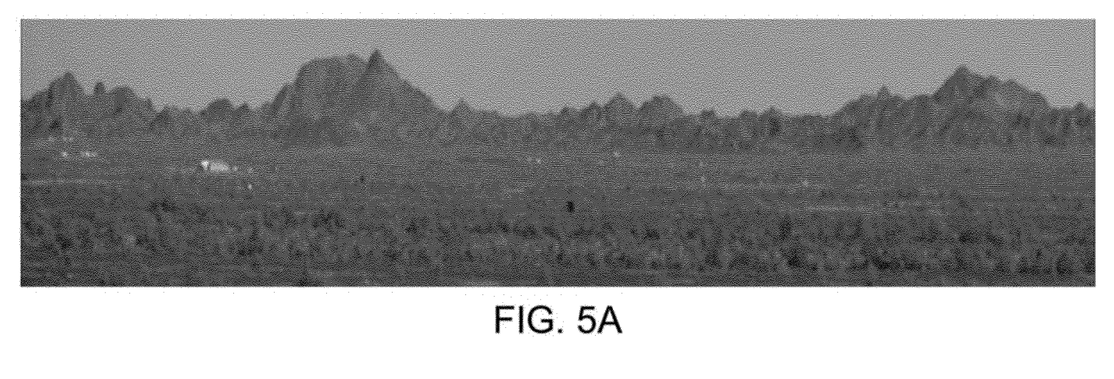
FIG. 5A is an original image extracted from a high resolution video sequence.
Figure 5B:
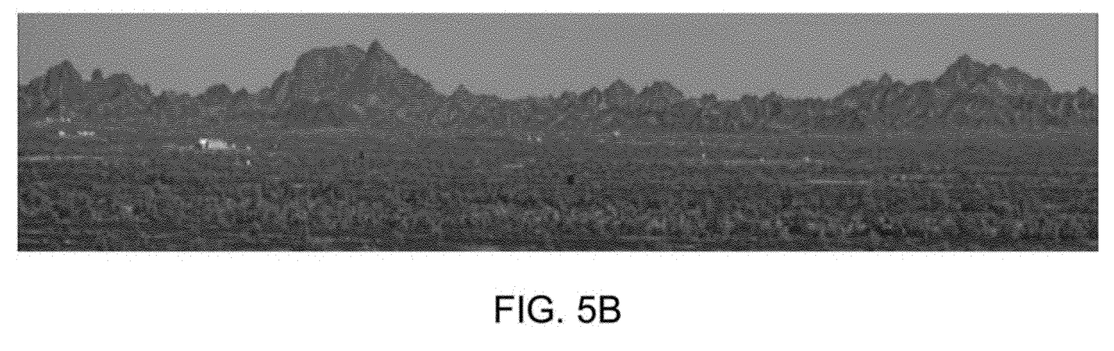
FIG. 5B is the de-hazed image resulting from the processing of the image in FIG. 5A with the system according to the principles of the present invention.

The de-hazing process optimized with acceleration according to the principles of the present invention was tested on a video sequence including 200 image frames captured by a high resolution camera. Each image frame was 3200 by 400 pixels in resolution. FIG. 5A illustrates an example of a hazy image, and its corresponding de-hazed result is shown in FIG. 5B. The image de-hazing system according to the principles of the present invention implemented on a CPU (e.g., Intel core i7 2.67 gigahertz (Hz)) processes this sequence in 13.6 seconds, which is approximately 15 frames per second. In comparison, the technique of Tarel et al. (see Literature Reference No. 1) processes frame by frame in 60.6 seconds, approximately 3.3 frames per second.

Figure 6A:
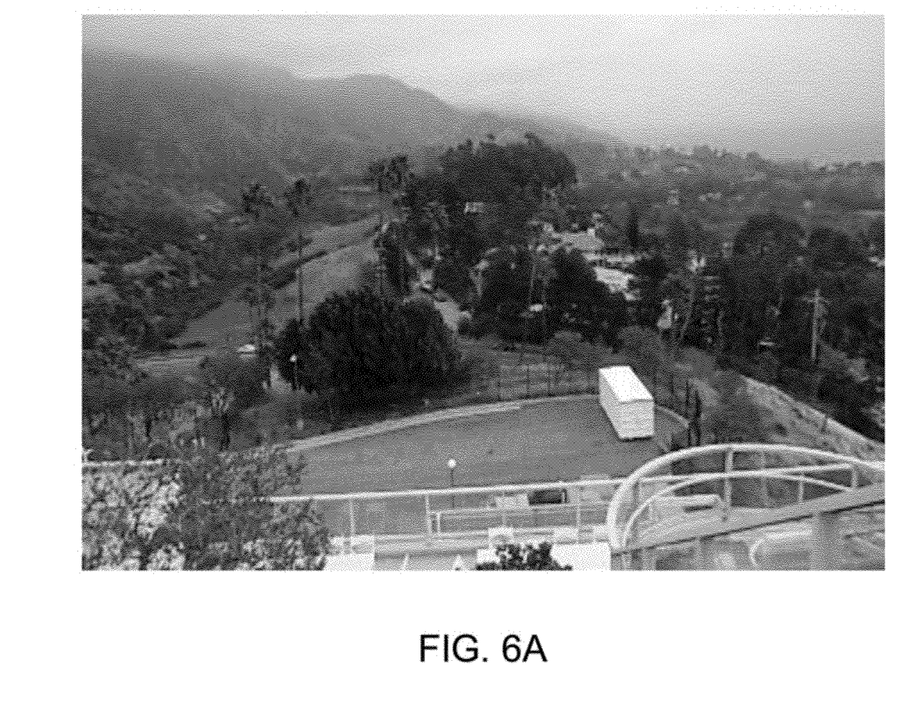
FIG. 6A is an original image extracted from a high resolution video sequence.
Figure 6B:
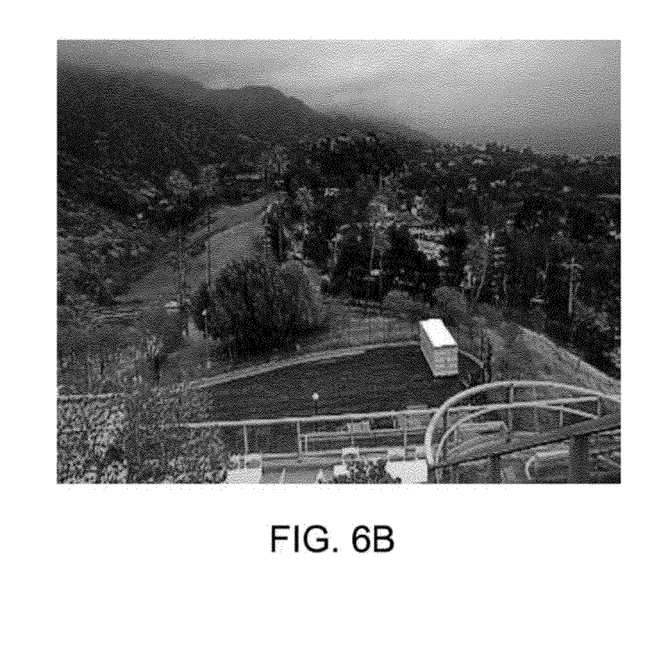
FIG. 6B is the de-hazed image resulting from the processing of the image in FIG. 6A with the system according to the principles of the present invention.
Figure 6C:
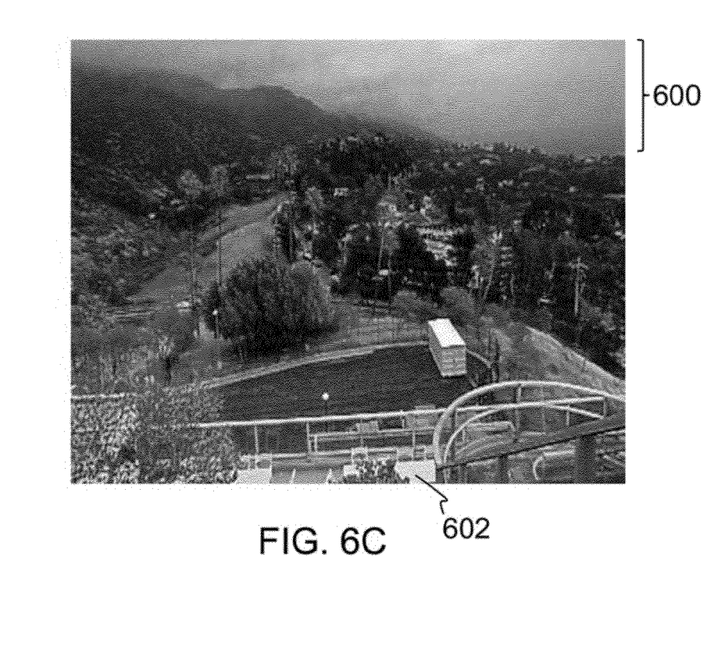
FIG. 6C is the de-hazed image resulting from the processing of the image in FIG. 6A with the baseline de-hazing process.

FIGS. 6A-6C depict a comparison between the de-hazing process optimized with acceleration according to the principles of the present invention and a baseline process described in Literature Reference No. 1. FIG. 6A depicts an original image, FIG. 6B depicts a de-hazed image obtained using the system according to the principles of the present invention, and FIG. 6C depicts the de-hazed image obtained using the approach described in Literature Reference No. 1. As is evident in FIG. 6C, the method disclosed in Literature Reference No. 1 tends to introduce artifacts (e.g., in the sky region 600) and distort the color (e.g., white building appears blue 602). These problems are mitigated by applying the sky detection of the present invention to provide a more robust estimate for the global atmospheric light.

(3.5.2) Optimization Using Scene Constraints

Figure 7:
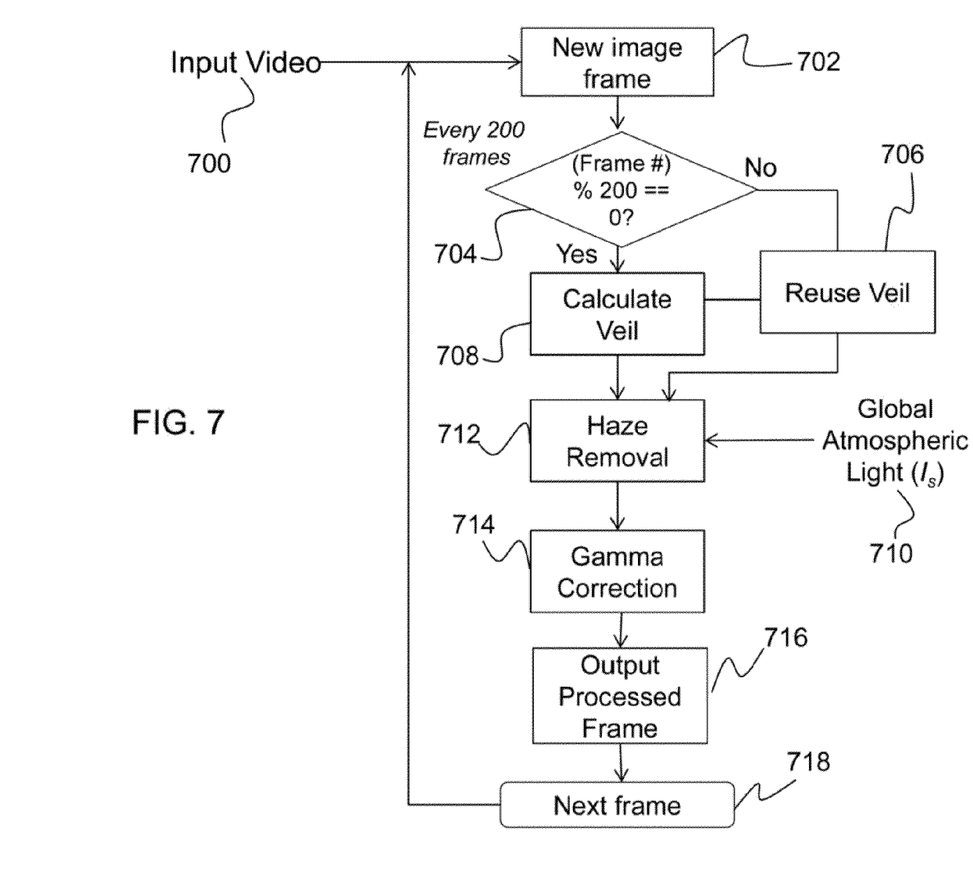
FIG. 7 illustrates the de-hazing process optimized with scene constraints according to the principles of the present invention.

Another way to apply de-hazing to object detection in video sequences is based on observations of certain scene conditions in which object detection in high-resolution videos from a stationary camera is required for surveillance. FIG. 7 illustrates the de-hazing process optimized with scene constraints according to the principles of the present invention. In this process, a single image frame is used to estimate the atmospheric veil V and that estimated atmospheric veil is applied to subsequent image frames. The atmospheric veil needs to be updated infrequently (i.e., every 200 image frames or even longer) to adapt to slow changes in haze and fog conditions.

As shown in FIG. 7, an input video 700 comprising a series of image frames as input is received as input. For a new image frame 702, a first test 704 is performed to determine the remainder of the image frame numbers with respect to 200, so that the first test 704 of "(Frame#) % 200==0" will be true every 200 image frames. If "no", then the system reuses the atmospheric veil 706 that was previously determined. If "yes", then the system calculates the atmospheric veil 708 (described below). Using the atmospheric veil and the global atmospheric light 710, haze removal 712 is performed, followed by an optional gamma correction 714. A processed image frame is output 716, and the process proceeds to the next image frame 718 in the input video 700.

Below are the steps for the de-hazing process according to the principles of the present invention using a specific scene constraint.

1. Take one input image from the input video (e.g., first image frame) of size N (row) by M (column). Find the minimal value of all three color components (red, blue, green) as well as the minimal value across each image row. Each image row gives one such minimal value. The result is a vector of size N. Let this vector be w.
2. Find the lower bound of w, which is a conservative estimate of the monotonically decreasing veil value as a function of image row. Let the resulting vector be z, which is the same size as w (N).
3. Use z as a column, and duplicate horizontally to form an image of N (row) by M (column). This is the veil map of the image, V (see equations (1) and (2) above).
4. Recover the input image and each subsequent image in the video sequence according to equation (2) using the veil map V. Re-estimate V every 200 frames according to steps 1-3.

Figure 8A:
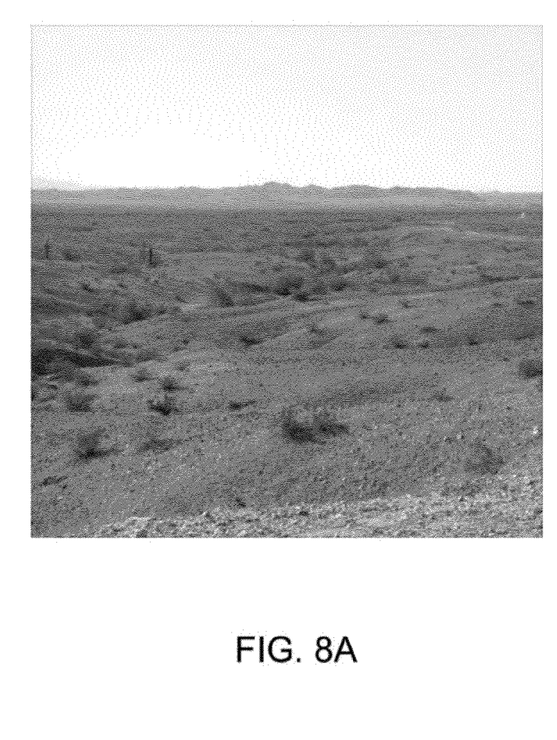
FIG. 8A is an original image extracted from a high resolution video sequence.
Figure 8B:
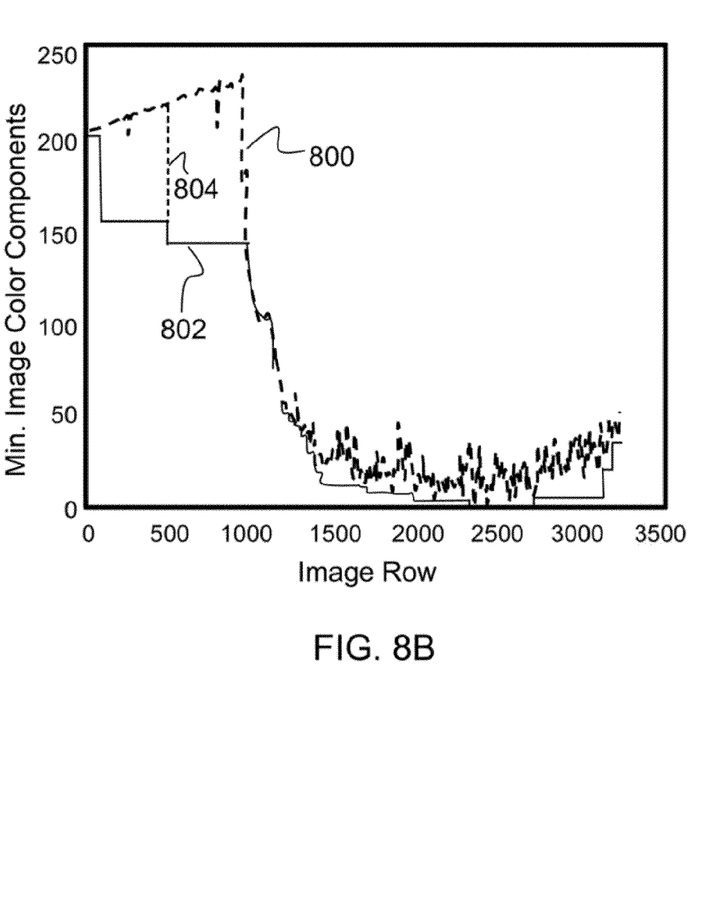
FIG. 8B is a plot of lower-bound estimates for vector w according to the principles of the present invention.

In step 2 above, an approach for finding the "lower-bound" of w is called for. Recall that w is the minimal value of the three color components across each row, and it is also a non-increasing function of its index (image row). FIG. 8A depicts an original image, and FIG. 8B is a plot of the "lower-bound" as the estimates for the veil from the values of vector w, which represents the minimum of image color components across each row of the image in FIG. 8A. The dashed curve 800 represents w, and the solid curve 802 is the "lower-bound". The same approach as described for the atmospheric veil above can be adopted to filter w to get the veil.

FIGS. 8A and 8B show an example in which the scene is a large landscape of mostly flat ground with or without mountains in the far distance. The horizontal axis of the image runs parallel to the horizon line. In this situation, the haze caused by the atmosphere, or light fog, is uniform across the horizon, and decreases monotonically (or at least non-increasingly) with the increase in image row coordinates (counting rows from the top of the image). Given this assumption, one can bypass the veil estimation approach described in section (3.5.1), and use a single value to represent the veil for each row of the image. Furthermore, the veil value for each row can be estimated based on the minimal value of the image color components of that row. This is a huge savings in computation compared with the approach described in Literature Reference No. 1. Further computational savings can be achieved by estimating the veil using only a single image frame, applying it to subsequent image frames, and only updating the veil map infrequently (e.g., every 200 or more frames) to adapt to slow change in haze/fog conditions.

Described above is an alternative "lower-bound" process that creates a rough approximation veil with a "non-increasing" function based on the values of w. As shown in FIG. 8B, w (represented by the dashed curve 800) not only contains ripples, but also some big errors due to sensor defects (e.g., the big downward spike 804 on the left side of the plot). Thus, the "lower-bound" process can be improved. For example, one can apply smoothing to w to remove small ripples and sensor defects. Furthermore, the "lower-bound" curve (i.e., solid curve 802) beyond rows corresponding to the minimum of w (near row 2400 in FIG. 8B) should stay the same (near 0) rather than go back up as shown. Nevertheless, the region in the image to which the object detection algorithm is applied in the experimental studies described herein is limited within rows 800 to 2000. Therefore, these improvements will not have much effect on the results presented below.

Figure 9:
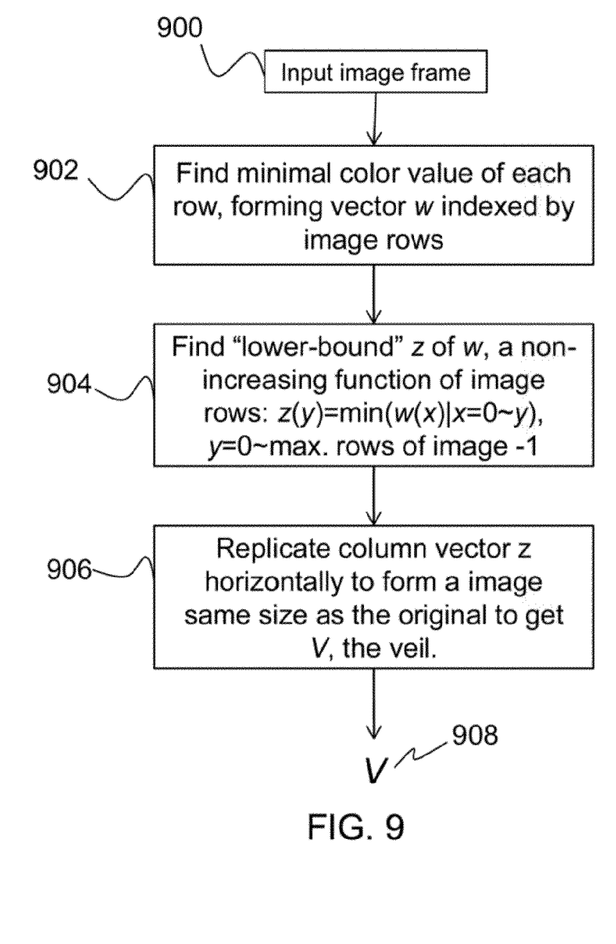
FIG. 9 illustrates atmospheric veil calculation for use with the de-hazing process optimized with scene constraints according to the principles of the present invention.

FIG. 9 illustrates atmospheric veil calculation for use with the de-hazing process optimized with scene constraints according to the principles of the present invention. The input to the veil calculation process is an input image frame 900. In a first step 902, the system finds the minimal color value of each row, forming a vector w indexed by image rows. In a second step 904, the system finds the "lower-bound" z of w, a non-increasing function of image rows (starting from the top edge of the image as row 0) according to the following: $z(y)=\min(w(x)|x=0\sim y)$, y=0~maximum rows of image−1. z is calculated as follows. For any y (ranging from 0 to the number of rows in an image minus 1), z(y) is equal to the minimum value of w(x) for x from 0 to y. In other words, z(y) is simply the smallest w at indexes 0 to y. In a third step 906, the system replicates the column vector z horizontally to form an image frame the same size as the original image frame to get V 908, the atmospheric veil.

(3.6) Experimental Results

Figure 10:
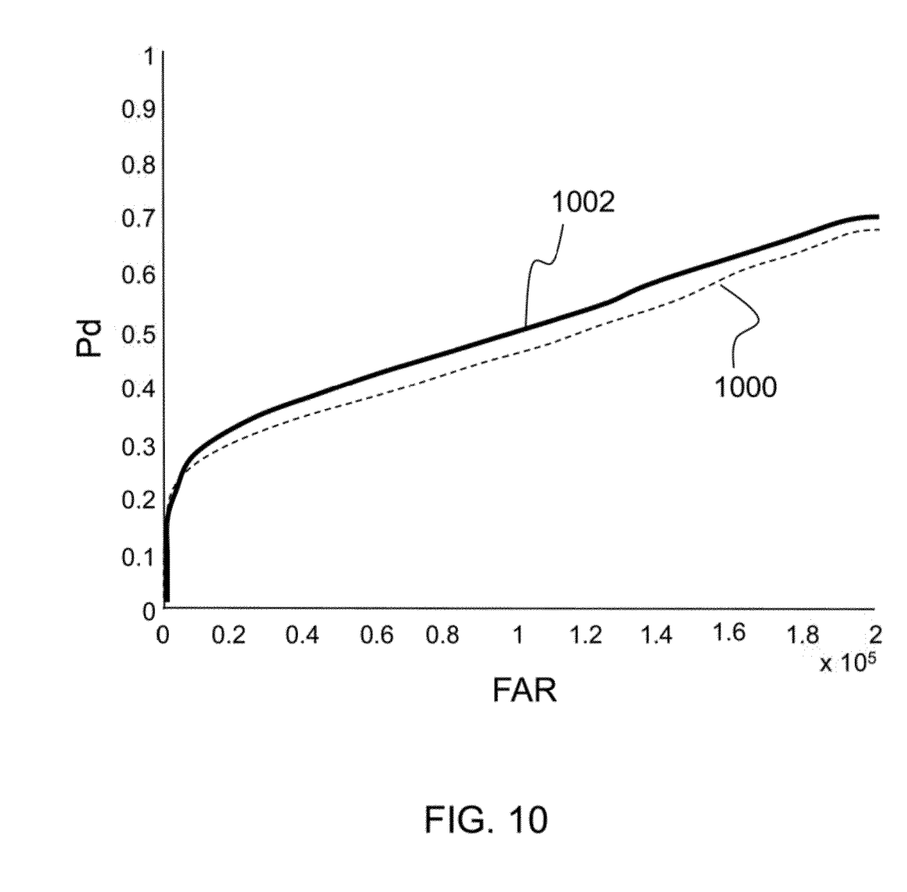
FIG. 10 is a ROC plot comparing an object detection process using an original video and the object detection process using videos after de-hazing according to the principles of the present invention.

Optimization using scene constraints according to the principles of the present invention was applied to a total of 19 video sequences for an object detection application. The original video as well as videos after de-hazing pre-processing were processed with the same object detection algorithm. The detection results were then compared with manually annotated ground truths of moving objects. As shown in FIG. 10, the resulting ROC curves were plotted using the original video (represented by the dashed curve 1000) and the video after de-hazing pre-processing (represented by the solid curve 1002). One can see that applying de-hazing achieved an approximate 5% increase in overall detection probability (Pd) under the same false alarm rate (FAR). FAR is given in terms of number of false detections per hour In summary, the present invention includes optimization approaches that can be applied to video sequences to achieve better object detection performance for real-time applications. The first approach exploits the fact that a fixed video sensor produces video images that do not change in value much except for locations where moving objects occur. This approach applies de-hazing on full-frame images through veil estimation on pixels whose values change from frame to frame (e.g. due to object motion in the image), and on the full image only very infrequently (e.g., every 200 frames or more). Since the number of pixels in images from a fixed video sensor is usually a fraction of total number of pixels in the image, and the veil for these pixels is only calculated every image frame and on every pixel (full frame image) very infrequently, this results in significant savings in computation. The second approach is also aimed at reducing computation of the prior art de-hazing process, while achieving robust de-hazing performance, by exploiting the constraints of imaging conditions of large landscape scenes. As a result, veil estimation can be done very infrequently (e.g., every 200 frames or more).

Based on experimental studies, it can be concluded that the decision to use the first optimized de-hazing process described herein (i.e., optimized de-hazing with acceleration) should be scene dependent, and only apply to scenes which have visible haze. The performance of the second optimized de-hazing process described herein (i.e., optimization using scene constraints) is more robust and does not suffer from this restriction, thanks to a more conservative estimation approach of the veil in the image. However, it does require more computation than the first approach, but still much less than that from the prior art described in Literature Reference No. 1.

What is claimed is:

1. A system for image de-hazing for video processing, the system comprising:
one or more processors and a non-transitory computer-readable medium having executable instructions encoded thereon such that when executed, the one or more processors perform operations of:
receiving a video comprising a series of image frames as input, wherein each image frame comprises a plurality of regions comprising a plurality of pixels;
for each image frame in the series of image frames, determining if a predetermined image frame number threshold has been reached;
wherein if the predetermined image frame number has not been reached, a previously determined atmospheric veil value is used, and wherein if the predetermined image frame number has been reached, a new atmospheric veil value is determined;
estimating a global atmospheric light value; and
generating a de-hazed image from the current image frame using either the previously determined atmospheric veil value or the new atmospheric veil value and the global atmospheric light value.

2. The system as set forth in claim 1, wherein the one or more processors further perform operations of:
for each image frame in the series of image frames, determining if pixels in a current image frame are similar to corresponding pixels in a previous image frame;
wherein if pixels in the current image frame are similar to the corresponding pixels in the previous image, then using a previously determined atmospheric veil value; and
wherein if the pixels in the current image frame are not similar to the corresponding pixels in the previous image frame, then a new atmospheric veil value is determined.

3. The system as set forth in claim 2, wherein the one or more processors further perform an operation of determining a sum of absolute differences (SAD) between each pixel in the previous image frame and a corresponding pixel in the current image frame.

4. The system as set forth in claim 3, wherein the one or more processors further performs an operation of estimating the global atmospheric light value as an average of a set of the brightest pixels in an upper region of the image frame.

5. The system as set forth in claim 1, wherein the one or more processors further performs an operation of determining the atmospheric veil value for an image frame, having a plurality of image rows, according to the following:
determining a minimal color value of each image row in the plurality of image rows, forming a vector w indexed by the plurality of image rows;
determining a non-increasing function of the plurality of image rows: of the vector w; and
replicating the vector w horizontally to form an image having the same size as the current image frame.

6. The system as set forth in claim 5, wherein the one or more processors further performs an operation of estimating the global atmospheric light value as an average of a set of the brightest pixels in an upper region of the image frame.

7. A computer-implemented method for image de-hazing for real-time video processing, comprising an act of causing one or more processors to execute instructions stored on a non-transitory memory such that upon execution, the one or more processors perform operations of:
receiving a video comprising a series of image frames as input, wherein each image frame comprises a plurality of regions comprising a plurality of pixels;
for each image frame in the series of image frames, determining if a predetermined image frame number threshold has been reached;
wherein if the predetermined image frame number has not been reached, a previously determined atmospheric veil value is used, and wherein if the predetermined image frame number has been reached, a new atmospheric veil value is determined;

estimating a global atmospheric light value; and generating a de-hazed image from the current image frame using either the previously determined atmospheric veil value or the new atmospheric veil value and the global atmospheric light value.

8. The method as set forth in claim 7, wherein the one or more processors further perform operations of:

for each image frame in the series of image frames, determining if pixels in a current image frame are similar to corresponding pixels in a previous image frame;

wherein if pixels in the current image frame are similar to the corresponding pixels in the previous image, then using a previously determined atmospheric veil value; and wherein if the pixels in the current image frame are not similar to the corresponding pixels in the previous image frame, then a new atmospheric veil value is determined.

9. The method as set forth in claim 8, wherein the one or more processors further perform an operation of determining a sum of absolute differences (SAD) between each pixel in the previous image frame and a corresponding pixel in the current image frame.

10. The method as set forth in claim 9, wherein the one or more processors further perform an operation of estimating the global atmospheric light value as an average of a set of the brightest pixels in an upper region of the image frame.

11. The method as set forth in claim 7, wherein the one or more processors further perform an operation of determining the atmospheric veil value for an image frame, having a plurality of image rows, according to the following:

determining a minimal color value of each image row in the plurality of image rows, forming a vector w indexed by the plurality of image rows;

determining a non-increasing function of the plurality of image rows z of the vector w; and replicating the vector w horizontally to form an image having the same size as the current image frame.

12. The method as set forth in claim 11, wherein the one or more processors further perform an operation of estimating the global atmospheric light value as an average of a set of the brightest pixels in an upper region of the image frame.

13. A computer program product for image de-hazing for real-time video processing, the computer program product comprising computer-readable instructions stored on a non-transitory computer-readable medium that are executable by a computer having a processor for causing the processor to perform operations of:

receiving a video comprising a series of image frames as input, wherein each image frame comprises a plurality of regions comprising a plurality of pixels;

for each image frame in the series of image frames, determining if a predetermined image frame number threshold has been reached;

wherein if the predetermined image frame number has not been reached, a previously determined atmospheric veil value is used, and wherein if the predetermined image frame number has been reached, a new atmospheric veil value is determined, estimating a global atmospheric light value; and generating a de-hazed image from the current image frame using either the previously determined atmospheric veil value or the new atmospheric veil value and the global atmospheric light value.

14. The computer program product as set forth in claim 13, further comprising instructions for causing the processor to perform operations of:

for each image frame in the series of image frames, determining if pixels in a current image frame are similar to corresponding pixels in a previous image frame;

wherein if pixels in the current image frame are similar to the corresponding pixels in the previous image, then using a previously determined atmospheric veil value; and wherein if the pixels in the current image frame are not similar to the corresponding pixels in the previous image frame, then a new atmospheric veil value is determined.

15. The computer program product as set forth in claim 14, further comprising instructions for causing the processor to perform an operation of determining a sum of absolute differences (SAD) between each pixel in the previous image frame and a corresponding pixel in the current image frame.

16. The computer program product as set forth in claim 15, further comprising instructions for causing the processor to perform an operation of estimating the global atmospheric light value as an average of a set of the brightest pixels in an upper region of the image frame.

17. The computer program product as set forth in claim 13, further comprising instructions for causing the processor to perform an operation of determining the atmospheric veil value for an image frame, having a plurality of image rows, according to the following:

determining a minimal color value of each image row in the plurality of image rows, forming a vector w indexed by the plurality of image rows;

determining a non-increasing function of the plurality of image rows z of the vector w; and replicating the vector w horizontally to form an image having the same size as the current image frame.

18. The computer program product as set forth in claim 17, further comprising instructions for causing the processor to perform an operation of estimating the global atmospheric light value as an average of a set of the brightest pixels in an upper region of the image frame.

\* \* \* \* \*